3,499,869
LIGHT STABLE POLYURETHANE

Gerald R. Lappin and Gordon C. Newland, Kingsport, Tenn., assignors to Eastman Kodak Company, Rochester, N.Y., a corporation of New Jersey
No Drawing. Filed July 28, 1967, Ser. No. 656,645
Int. Cl. C08g 51/62
U.S. Cl. 260—45.75     9 Claims

ABSTRACT OF THE DISCLOSURE

An improved spandex type polymer having incorporated therein a metal chelate, for example, a metal chelate of a 1,3-diketone enol, for the purpose of providing increased ultraviolet light resistance to the polymer.

---

This invention relates to spandex type polymers and, more particularly, this invention relates to spandex polymers having increased ultraviolet light resistance.

By a spandex type polymer, we mean a polymer formed from a substantially linear, segmented elastomeric material. The words "substantially linear" are not intended to exclude structures having branches extending out from the polymer chain, but exclude only those structures that are highly cross-linked. The words "segmented elastomer" means that the elastomer under consideration has segments of a high melting point crystalline polymer, that is, hard segments, that alternate with segments of a low melting point, amorphous polymer, that is, soft segments.

It is generally known in the art that various polymeric materials are susceptible to degradation from ultraviolet light, particularly those types of polymers which have found usefulness in the textile industry. In the past it has been found quite necessary to provide some type of resistance to ultraviolet light for synthetic textile fibers because wearing apparel manufactured from such fibers will almost inevitably come in contact with an ultraviolet light source at some point during its useful life. The problem has been found to be particularly unique and critical in textile fibers because of the relatively large surface area that is exposed to the ultraviolet light source. However, degradation due to ultraviolet light may also appear in other product forms such as, for example, sheeting materials and coatings.

One of the primary sources of ultraviolet light is the sun's rays. It has been found that prolonged exposure of synthetic textile fibers to rays of the sun will generally cause fiber degradation to varying extents. The amount of degradation experienced, however, depends to a great extent upon the type of polymer from which the textile fiber is manufactured.

Other sources of ultraviolet light may be found in the rays of fluorescent lamps such as are used in places of business and industry, as well as in the home. A lesser known source of ultraviolet light, although one which is most critical when textile fabrics made from synthetic polymers are involved, may be the household clothes dryer. The home clothes dryer normally contains some type of lamp, commonly used for germicidal purposes, within the confines of the drying compartment. The germicidal lamp is normally activated during an entire drying cycle, thereby exposing the tumbling articles of clothing to a continuous ultraviolet light source while they are being dried.

Ultraviolet light may adversely affect polymers from which synthetic textile fibers are made in a number of different ways. Probably the most common deleterious effect is loss in general tensile properties of the synthetic fibers. For example, a rather sharp reduction in strength of synthetic textile fibers will take place, and is not unexpected, upon prolonged exposure to ultraviolet light. In addition, it is not uncommon for the aesthetic characteristics of such fibers to be drastically affected by ultraviolet light. For example, undesirable color changes may take place in the fibers, that is, the synthetic fibers often develop a yellow tinge. Also, the surface of the fibers may become quite dull and chalky. Of course, such color changes and surface dulling is completely unacceptable from the retailer's, as well as the consumer's, standpoint. Thus, a solution to the ultraviolet light degradation problem had to be developed for products, in particular textile fibers, made from synthetic polymers.

Ultraviolet light inhibitors, as they are commonly called in the art, are well known for certain polymers that have found general use in the textile fiber industry. A great number of ultraviolet light inhibitors of many different classes and descriptions have been discovered and have been usefully employed to reduce the amount of degradation in synthetic textile fibers formed from these polymers.

It is well known that certain types of synthetic polymers are more light stable, when in fiber form, than are others. If all synthetic textile fibers manufactured from polymeric materials are considered as a group, that group can be divided into substantially three subgroups, namely, (a) fibers exhibiting a high degree of light stability, (b) fibers exhibiting an intermediate degree of light stability, and (c) fibers exhibiting a low degree of light stability. Typical of group (a) are nylon and polyethylene terephthalate. Typical of group (b) are polyethylene and polypropylene. However, it is generally accepted that fibers manufactured from spandex type polymers exhibit the least degree of light stability of any type synthetic fibers utilized in the textile industry, that is, they are substantially last in group (c).

The low degree of ultraviolet light stability exhibited by spandex polymers arises primarily because of the unique nature of the spandex chemistry. The spandex type polymer is inherently unstable in light because of the way it tends to break down upon being exposed to ultraviolet light. As a matter of interest, certain spandex type polymers will even return to a liquid state if they are exposed to ultraviolet light for a sufficiently prolonged period of time. Needless to say, the problems that are found with ultraviolet light degradation in other types of polymeric materials that are useful in the manufacture of textile fibers are also known to spandex type polymers. However, these problems are actually increased with spandex polymers and occur at a much quicker pace than they occur in other types of polymers.

Because of the fact that textile fibers formed from spandex polymers are "stretch" fibers, there are a number of additional parameters that are adversely affected by ultraviolet light in addition to the strength and color of the fiber. For example, spandex fibers exhibit a number of elastic characteristics which are very much adversely affected upon exposure to ultraviolet light. Such parameters include elastic recovery, power, permanent set, and others which characterize "stretch" fibers.

Therefore, even though numerous ultraviolet light inhibitors are known for polymers which are relatively stable, it has been found that those ultraviolet light inhibitors are not acceptable for spandex type polymers as they do not adequately protect spandex polymers from ultraviolet light degradation.

The inventive concept of this invention is based upon a spandex type polymer composition that includes an ultraviolet light inhibitor selected from the group comprising (a) metal chelates of 1,3-diketone enols, (b) metal chelates of 2-acylphenol oximes, (c) metal salts of dialkyl dithiocarbamic acid, and (d) metal chelates of 2-(2-hydroxyphenyl) benzotriazole.

Thus, it has been a primary objective of this invention to provide an ultraviolet light inhibitor that is useful and practical for spandex type polymers.

It has been another objective of this invention to provide an ultraviolet light inhibitor which effectively limits the degradation of textile fibers manufactured from spandex type polymers.

These and other objectives of this invention will be made more clear from the following detailed description of the invention.

Generally, and as is well known in the art, spandex type polymers are produced by first creating the spandex prepolymer. The spandex prepolymer is typically formed by reacting a polymeric glycol, such as a polyether glycol, copolyether glycol, polyester glycol, copolyester glycol, or poly(ether-ester) glycol, denoted as G in the equations below, with a stoichiometric excess of an isocyanate, denoted as I in the equations below. An excess of isocyanate is normally used to ensure that an isocyanate capped prepolymer, that is, the intermediate product whose polymer chains are terminated with isocyanate groups, is produced. The prepolymer reaction proceeds substantially as follows, although it will be understood that the resulting prepolymer obtained actually constitutes a conglomeration of monomer, polymer, oligomer, and unreacted isocyanate:

(1) $\qquad (n+1)I + G \rightarrow I(G-I)$ 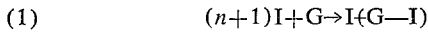

wherein $n$ represents 0, 1, 2, 3, and so on to give the conglomerate mixture. The difunctional prepolymer is then generally placed in a solvent medium, particularly if textile fibers, elastic sheeting, or film coatings are to be the final product.

A suitable difunctional chain extender, for example, water or any of numerous diamine chain extenders known to the art, is then added to the prepolymer solution. Sufficient chain extender is added to the prepolymer solution to ensure that substantially all isocyanate groups react, thereby chain extending the prepolymer and forming the final spandex polymer. The following equation, wherein D represents the amine groups, schematically represents the chain extension of a spandex prepolymer:

(2) $\qquad n(I-G-I) + nD \rightarrow (D-I-G-I-)_n$ 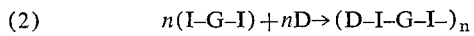

Because the spandex prepolymer is normally chain extended while in a suitable solvent medium, the spandex dope so formed may then easily be spun, by either wet or dry spinning techniques, into textile fibers, or extruded into elastic sheeting, or cast into coatings, and so forth, of the spandex polymer.

While the inventive concept of this application may be used with substantially any spandex polymer, it is particularly useful and preferred for use with certain types of spandex polymers disclosed in U.S. application Ser. No. 379,002 (now abandoned); 379,020 (now abandoned); 378,950 (now abandoned); 378,961 (now abandoned); and 378,963 (now U.S. Patent No. 3,386,942). Such polymers may be prepared and produced, for example, as spinning solutions or dopes, according to methods set forth in U.S. application Ser. No. 378,951 (now abandoned), and 378,711 (now U.S. Patent No. 3,415,790), all the aforementioned applications having been assigned to the assignee of this application. For example, the spandex polymer disclosed in U.S. application Ser. No. 379,002 is very beneficially affected by incorporating the additives of this invention and it comprises a poly(etherurethane-urea) composed of (1) polyethers including urethane linked oligomers thereof having a molecular weight of from about 3,000 to about 12,000, (2) organic functionally aliphatic diisocyanates, and (3) water and/or organic functionally aliphatic non-hindered diamines, in which segmented copolymers from 2% to 9% by weight consist of urea segments. These substantially linear, segmented elastomers, where the urea segment is composed of a single repeat unit, can be represented by the general formula:

—A—NH—CO—O—P—O—CO—NH—A—NH—
CO—NH—D—NH—CO—NH— 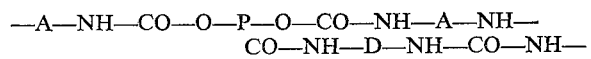

wherein the urea or hard segment has the formula:

—A—NH—CO—NH—D—NH—CO—NH— 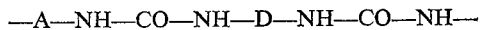

and the soft segment, which contains the polyether glycol or other hydroxyl terminated polymeric residue, has the formula:

—A—NH—CO—O—P—O—CO—NH— 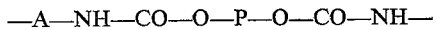

The —A— and —D— radicals may be different or the same in each repeat unit of the above formulas. The —A— radical is the bivalent organic radical of a functionally aliphatic diisocyanate having the formula: OCN—A—NCO, and the —D— radical is the bivalent organic radical of a functionally aliphatic, non-hindered diamine having the formula: $NH_2$—D—$NH_2$. The —P— radical is the bivalent organic radical of a polyether glycol having the formula: HO—P—OH. The polyether glycol may be replaced with a polyester glycol or a poly(ester-ether) glycol of analogous properties and also being represented by the formula: HO—P—OH.

As stated, this invention is based on the concept of a spandex type polymer in combination with an ultraviolet light inhibitor selected from the group comprising (a) metal chelates of 1,3-diketone enols, (b) metal chelates of 2-acylphenol oximes, (c) metal salts of dialkyl dithiocarbamic acids, and (d) metal chelates of 2-(2-hydroxyphenyl) benzotriazoles.

The metal chelates of 1,3-diketone enols may be generally represented by the formula:

I. 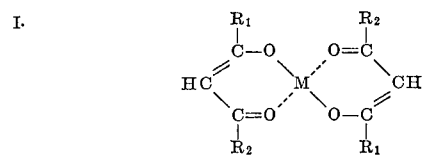

wherein $R_1$ and $R_2$ constitute either an alkyl group or an aryl group, and wherein M constitutes either an $Ni^{+2}$ or $Cu^{+2}$. The alkyl group may be of a formula $CH_3$ to $C_{20}H_{41}$. By an aryl group, we mean any organic compound which includes at least one aromatic ring and, preferably, wherein not more than about 50 carbon atoms are present.

The metal chelates of 2-acylphenol oximes may be generally represented by the formula:

II. 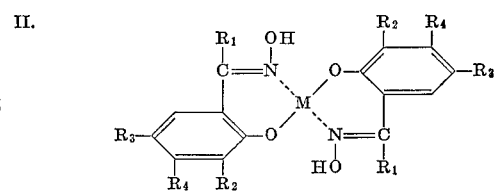

wherein $R_1$ constitutes either an aryl group, as before defined, or an alkyl group of a formula $CH_3$ to $C_{20}H_{41}$. $R_2$ and $R_3$ may be either a hydrogen, a nitro group having the formula —$NO_2$; an amino group having the formula —$NH_2$; a trifluoromethyl group having the formula —$CF_3$; a cyano group having the formula —CN; a hydroxy group having the formula —OH; an alkoxy group having the formula —O-alkyl wherein the alkyl is of a formula $CH_3$ to $C_{20}H_{41}$; or an alkyl group of a formula $CH_3$ to $C_{20}H_{41}$. Again, M constitutes either $Ni^{+2}$ or $Cu^{+2}$.

The metal salts of dialkyl dithiocarbamic acids may be generally represented by the formula:

III. 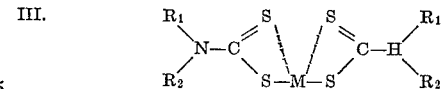

wherein $R_1$ and $R_2$ constitute either an alkyl group of a formula $CH_3$ to $C_{20}H_{41}$; an aryl group as before defined; or hydrogen. Again, M constitutes either $Ni^{+2}$ or $Cu^{+2}$.

The metal chelates of 2-(2-hydroxyphenyl) benzotriazoles may be generally represented by the formula:

IV.
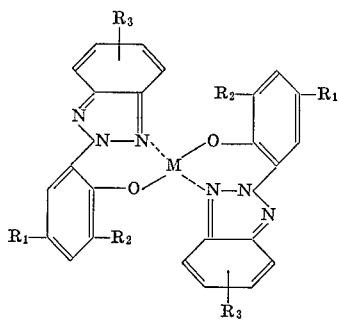

wherein $R_1$ and $R_2$ constitute either hydrogen or an alkyl group having a formula $CH_3$ to $C_{20}H_{41}$. $R_3$ constitutes either hydrogen; an alkyl group of a formula $CH_3$ to $C_{20}H_{41}$; or chlorine. Again, M constitutes either $Cu^{+2}$ or $Ni^{+2}$.

Suitable examples of the Group I ultraviolet light inhibitors are (a) nickel acetylacetonate wherein $R_1$ and $R_2$ are $CH_3$ and M is $Ni^{+2}$; (b) nickel chelate of dibenzoylmethane wherein $R_1$ and $R_2$ are phenyl and M is $Ni^{+2}$; (c) copper acetylacetonate wherein $R_1$ and $R_2$ are $CH_3$ and M is $Cu^{+2}$; and (d) copper chelate of dibenzoylmethane wherein $R_1$ and $R_2$ are phenyl and M is $Cu^{+2}$.

Suitable examples of Group II are (a) nickel chelates with 2-octanoylphenol oxime where $R_1$ is $C_7H_{15}$; $R_2$, $R_3$ and $R_4$ are H; and M is $Ni^{+2}$; (b) copper chelate with 2-octanoylphenol oxime wherein $R_1$ is $C_7H_{15}$; $R_2$, $R_3$, and $R_4$ are H; and M is $Cu^{+2}$; (c) nickel chelate with 2-lauroyl-5-methylphenol oxime wherein $R_1$ is $C_{11}H_{23}$; $R_2$ and $R_4$ are H; $R_3$ is $CH_3$; and M is $Ni^{+2}$; (d) copper chelate with 2-lauroyl-5-methylphenol oxime wherein $R_1$ is $C_{11}H_{23}$; $R_2$ and $R_4$ are H; $R_3$ is $CH_3$; and M is $Cu^{+2}$; (e) nickel chelate with 2 - lauroyl - 3,5 - dimethylphenol oxime wherein $R_1$ is $C_{11}H_{23}$; $R_2$ and $R_4$ are $CH_3$; $R_4$ is H; and M is $Ni^{+2}$; (f) copper chelate with 2-lauroyl-3,5-dimethylphenol oxime wherein $R_1$ is $C_{11}H_{23}$; $R_2$ and $R_3$ are $CH_3$; $R_4$ is H; and M is $Cu^{+2}$; (g) nickel chelate with 2-lauroyl-3-dodecyl-5-methylphenol oxime wherein $R_1$ is $C_{11}H_{23}$; $R_2$ is $C_{12}H_{25}$; $R_3$ is $CH_3$; $R_4$ is H; and M is $Ni^{+2}$; (h) copper chelate with 2-lauroyl-3-dodecyl-5-methylphenol oxime wherein $R_1$ is $C_{11}H_{23}$; $R_2$ is $C_{12}H_{25}$; $R_3$ is $CH_3$; $R_4$ is H; and M is $Cu^{+2}$; (i) nickel chelate with 2-hydroxy-4-(dodecyloxy) benzophenone oxime wherein $R_1$ is phenyl; $R_2$ and $R_3$ are H; $R_4$ is $C_{12}H_{25}O$—; and M is $Ni^{+2}$; (j) copper chelate with 2-hydroxy-4-(dodecyloxy) benzophenone oxime wherein $R_1$ is phenyl; $R_2$ and $R_3$ are H; $R_4$ is $C_{12}H_{25}O$—; and M is $Cu^{+2}$.

Suitable examples of Group III are (a) nickel N,N-dibutyldithiocarbamate wherein $R_1$ and $R_2$ are $C_4H_9$; and M is $Ni^{+2}$; (b) copper N,N-dibutyldithiocarbamate wherein $R_1$ and $R_2$ are $C_4H_9$; and M is $Cu^{+2}$; (c) nickel N,N-dioctyldithiocarbamate wherein $R_1$ and $R_2$ are $C_8H_{17}$; and M is $Ni^{+2}$; (d) copper N,N-dioctyldithiocarbamate wherein $R_1$ and $R_2$ are $C_8H_{17}$; and M is $Cu^{+2}$; (e) nickel N,N-dicyclohexyldithiocarbamate wherein $R_1$ and $R_2$ are cyclohexyl; and M is $Ni^{+2}$; (f) copper N,N-dicyclohexyldithiocarbamate wherein $R_1$ and $R_2$ are cyclohexyl; and M is $Cu^{+2}$; (g) nickel N-methyl-N-octadecyldithiocarbamate wherein $R_1$ is $CH_3$; $R_2$ is $C_{18}H_{37}$; and M is $Ni^{+2}$; and (h) copper N-methyl-N-octadecyldithiocarbamate wherein $R_1$ is $CH_3$; $R_2$ is $C_{18}H_{37}$; and M is $Cu^{+2}$.

Suitable examples of Group IV are (a) nickel chelate with 2-(2-hydroxy-5-methylphenyl) benzotriazole wherein $R_1$ is $CH_3$; $R_2$ and $R_3$ are H; and M is $Ni^{+2}$; (b) copper chelate with 2-(2-hydroxy-5-methylphenyl) benzotriazole wherein $R_1$ is $CH_3$; $R_2$ and $R_3$ are H; and M is $Cu^{+2}$; (c) nickel chelate with 2-(3,5-di-t-amyl-2-hydroxyphenyl) benzotriazole wherein $R_1$ and $R_2$ are t-$C_5H_{11}$—; $R_3$ is H; and M is $Ni^{+2}$; and (d) nickel chelate with 2-(3-t-butyl-2-hydroxy-5-methylphenyl)-5-chlorobenzotriazole wherein $R_1$ is $CH_3$; $R_2$ is t-$C_4H_9$—; $R_3$ is 5-chloro; and M is $Ni^{+2}$.

The ultraviolet light inhibitors are included with the spandex polymer at a concentration of between about 0.1% to about 10.0% in order that adequate retarding of polymer degradation may be obtained. However, in commercial practice the ultraviolet light inhibitors of this invention usually may be incorporated at a concentration of between about 1.0% to about 5.0% to obtain desirable and useful results. While the amount of the inhibitor included in a given spandex polymer will generally be dependent on the chemistry of the polymer, beneficial effects are noted when amounts falling within the above stated ranges are used.

Although the ultraviolet light inhibitors of this invention are useful by themselves with spandex type polymers, it has been found desirable to utilize an antioxidant in the spandex polymer in combination with the ultraviolet light inhibitors of this invention. When an antioxidant of the preferred type is so used in combination with the inhibitors of this invention, the ultraviolet light exposure life of textile fibers formed from such spandex polymer compositions has been found to increase from between about twofold to about tenfold. It has been found that the most preferred type of antioxidants for use with the ultraviolet light inhibitors of this invention are phenolic antioxidants such as, for example, 2,6-didodecyl-p-cresol; 2,6-bis(methylheptadecyl-p-cresol); ditert-butyl-p-cresol; and Santowhite powder manufactured by the Monsanto Co.; and other equally well known phenolic antioxidants. Phenolic antioxidants may be characterized as primary antioxidants and, in general, primary antioxidants, as opposed to secondary antioxidants, are preferable for use with the light inhibitors of this invention. However, secondary antioxidants also give improved results, and typical examples of such secondary antioxidants include organic phosphites, for example, triphenyl phosphite, and Polyguard manufactured by Western Chemical Co.; and esters of thiodipropionic acid, for example, dilauryl-3,3'-thiodipropionate and distearyl-3,3'-thiodipropionate.

The main function of the antioxidants is to prevent oxidation of the spandex polymer by air during formulation of the spandex type polymer, as well as during the use of the end product manufactured from such polymer, particularly when such use occurs at high temperatures.

Other additives may also be included in various spandex polymer formulations in order to give a desirable color to the spandex products being manufactured. It has been found useful to include pigments such as titanium dioxide, zinc oxide, carbon black, lead chromate, and others.

While the ultraviolet light inhibitors of this invention, as well as the antioxidants and pigments, may be incorporated with the spandex polymer at substantially any stage in its manufacture where it is feasible to do so, it is preferred to incorporate such additives during the chain extension stage of manufacture. That is, after the prepolymer has been formed it is normally placed in a solvent medium and thereafter the chain extender is mixed with the prepolymer solution to formulate the spandex polymer, as was previously explained. Thus, while the prepolymer is in solution the ultraviolet light inhibitor, antioxidants, and/or pigments may be added simultaneous with, prior to, or after the addition of the chain etxender.

It is most preferred, however, that the spandex dope be completely formulated or chain extended first. Thereafter the additives are added to the dope by dispersing the additives in a minimum amount of solvent, preferably the same solvent as was utilized in formation of the dope, and thereafter adding same to the dope, with agitation, until the additive is substantially dispersed within the spandex dope.

When it is desired to manufacture, for example, spandex fibers, it is the general practice in the industry to spin or extrude fibers from the spandex dope supply, with the additives therein, through a spinneret plate having a plurality of spinning orifices. The spandex dope is forced through the spinneret orifices under pressure and exits from the spinning head into either a hot gaseous medium, commonly known as dry spinning, or a liquid medium, commonly known as wet spinning. Both the liquid and gaseous mediums tend to serve the same purpose, namely, the curing of the spandex fibers to provide them with sufficient body integrity. Subsequently, the fibers may be subjected to further downstream treating steps for enhancing their physical properties and commercial attributes. For example, the spandex fibers may be subjected to a heat treating step whereat they are simultaneously stretched and heated to an elevated temperature to increase their physical properties. Also, the plurality of monofilament fibers may be coalesced together to form an integral yarn strand for the purpose of adding to commercial desirability.

The following example serves to illustrate our invention; however, it is included merely for the purpose of illustration and not for the purpose of limiting the scope of the inventive concept as claimed. All percentages in the following example are expressed in percent by weight, unless otherwise stated.

EXAMPLE

A spinning dope of a chain extended spandex type polymer is prepared according to the disclosure of U.S. application Ser. No. 379,002, assigned to the assignee of this application. To this spinning dope is added 4% of titanium dioxide as pigment, and 2% of 2,6-didodecyl-p-cresol and 1% of dilauryl-3,3'-thiodipropionate as antioxidants. All percentages are based on the solids content of the spinning dope. The spinning dope is then divided into a number of separate portions.

Control fibers are then prepared from one portion of the dope by wet spinning techniques. The other portions of this dope each receive a different additive, in accordance with the invention, by dissolving each of the additives in a minimum amount of hot N,N-dimethylacetamide solvent, adding this solution to the chain extended polymer spinning dope, and agitating the dope until the additive is completely dispersed. Fibers are then spun from these dopes utilizing wet spinning techniques.

All of the fibers are then tested, following the subsequently described testing techniques, and the results tabulated in the following tables. Table I involves ultraviolet light inhibitors from Group I; Table II is for Group II additives; Table III is for Group III additives; and Table IV is for Group IV additives, as they were previously defined.

To test the effects of the various ultraviolet light inhibitors approximately 2 meters of each fiber, spun from each separate portion of the spinning dopes, are wound on a white cardboard about 1 x 2 in. in size. The sample is then exposed in a Fade-Ometer, manufactured by Atlas Electric Devices Co., for 10 hr. periods in incremental fashion. At the end of each exposure period, the sample is examined for signs of deterioration. The sample is deemed to have failed if any of the following changes are noted: (a) stickiness on fiber surface, (b) presence of at least several broken fibers, or (c) most fibers broke upon slight extension. The hours to failure are then tabulated in the following tables for each spandex polymer inhibitor composition.

TABLE I.—METAL CHELATES OF 1,3-DIKETONE ENOLS

| Percent Additive | $R_1$ | $R_2$ | M | Hours to failure |
|---|---|---|---|---|
| 0.0 | Control | | | 20 |
| 2.0 | $CH_3$ | $CH_3$ | $Ni^{+2}$ | 40 |
| 2.0 | $CH_3$ | $CH_3$ | $Cu^{+2}$ | 80 |
| 2.0 | $C_6H_5$ | $C_6H_5$ | $Ni^{+2}$ | 50 |
| 2.0 | $C_6H_5$ | $C_6H_5$ | $Cu^{+2}$ | 90 |

TABLE II.—METAL CHELATES OF 2-ACYLPHENOL OXIMES

| Percent Additive | $R_1$ | $R_2$ | $R_3$ | $R_4$ | M | Hours to failure |
|---|---|---|---|---|---|---|
| 0.0 | Control | | | | | 20 |
| 2.0 | $C_7H_{15}$ | H | H | H | $Ni^{+2}$ | 120 |
| 2.0 | $C_7H_{15}$ | H | H | H | $Cu^{+2}$ | 70 |
| 2.0 | $C_{11}H_{23}$ | H | $CH_3$ | H | $Ni^{+2}$ | 100 |
| 2.0 | $C_{11}H_{23}$ | H | $CH_3$ | H | $Cu^{+2}$ | 80 |
| 2.0 | $C_{11}H_{23}$ | $C_{12}H_{25}$ | $CH_3$ | H | $Ni^{+2}$ | 100 |
| 2.0 | $C_{11}H_{23}$ | $CH_3$ | $CH_3$ | H | $Ni^{+2}$ | 130 |
| 2.0 | $C_6H_5$ | H | H | $C_{12}H_{25}O$ | $Ni^{+2}$ | 110 |
| 2.0 | $C_6H_5$ | H | H | $C_{12}H_{25}O$ | $Cu^{+2}$ | 90 |

TABLE III.—METAL SALTS OF DIALKYLDITHIOCARBAMIC ACIDS

| Percent Additive | $R_1$ | $R_2$ | M | Hours to failure |
|---|---|---|---|---|
| 0.0 | Control | | | 20 |
| 2.0 | $C_4H_9$ | $C_4H_9$ | $Ni^{+2}$ | 150 |
| 2.0 | $C_4H_9$ | $C_4H_9$ | $Cu^{+2}$ | 80 |
| 2.0 | $C_8H_{17}$ | $C_8H_{17}$ | $Ni^{+2}$ | 100 |
| 2.0 | $C_8H_{17}$ | $C_8H_{17}$ | $Cu^{+2}$ | 60 |
| 2.0 | $CH_3$ | $C_{18}H_{37}$ | $Ni^{+2}$ | 120 |

TABLE IV.—METAL CHELATES OF 2-(2-HYDROXYPHENYL) BENZOTRIAZOLES

| Percent Additive | $R_1$ | $R_2$ | $R_3$ | M | Hours to failure |
|---|---|---|---|---|---|
| 0.0 | Control | | | | 20 |
| 2.0 | $CH_3$ | H | H | $Ni^{+2}$ | 40 |
| 2.0 | $CH_3$ | H | H | $Cu^{+2}$ | 30 |
| 2.0 | $t-C_5H_{11}$ | $t-C_5H_{11}$ | H | $Ni^{+2}$ | 50 |
| 2.0 | $t-C_5H_{11}$ | $t-C_5H_{11}$ | H | $Cu^{+2}$ | 30 |
| 2.0 | $CH_3$ | $t-C_4H_9$ | Cl | $Ni^{+2}$ | 60 |
| 2.0 | $CH_3$ | $t-C_4H_9$ | Cl | $Cu^{+2}$ | 40 |

Thus, from the above tables, it will be observed that in all cases at least a twofold increase in exposure life is established, no matter what group compound is used. In the case of certain particular compounds there are observed exposure life increases of up to sixfold and sevenfold.

Although the invention has been described in considerable detail with particular reference to certain preferred embodiments thereof, variations and modifications can be effected within the spirit and scope of the invention as described hereinbefore, and as defined in the appended claims.

Having described our invention, what we desire to claim and protect by Letters Patent is:

1. An improved polymer comprising a fiber-forming polyurethane containing at least 85% segmented urethane groups and an ultraviolet light inhibitor selected from the group consisting of metal chelates of 1,3-diketone enols represented by the formula

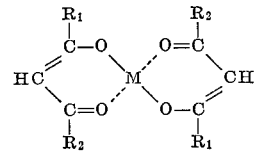

wherein $R_1$ and $R_2$ are selected from the group consisting of alkyl and aryl groups; and M is selected from the group consisting of $Ni^{+2}$ and $Cu^{+2}$, and metal chelates of 2-acylphenol oximes represented by the formula

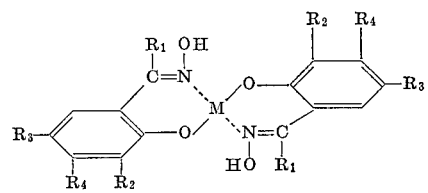

wherein $R_1$ is selected from the group consisting of alkyl and aryl groups $R_2$ and $R_3$ are selected from the group consisting of hydrogen, —O-alkyl groups, hydroxy groups, nitro groups, amino groups, cyano groups, trifluoromethyl groups and alkyl groups; and M is selected from the group consisting of $Ni^{+2}$ and $Cu^{+2}$.

2. A composition of matter as set forth in claim 1 wherein the ultraviolet light inhibitor selected is said metal chelates of 1,3-diketone enols represented by the formula

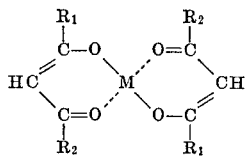

wherein $R_1$ and $R_2$ are selected from the group consisting of alkyl and aryl groups; and M is selected from the group consisting of $Ni^{+2}$ and $Cu^{+2}$.

3. A composition of matter as set forth in claim 2 wherein said alkyl groups include no more than about twenty carbon atoms, and said aryl groups include no more than about fifty carbon atoms.

4. A composition of matter as set forth in claim 1 wherein the ultraviolet light inhibitor selected in said metal chelates of 2-acylphenol oximes represented by the formula

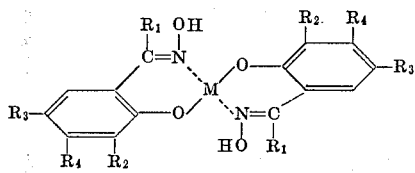

wherein $R_1$ is selected from the group consisting of alkyl and aryl groups, $R_2$ and $R_3$ are selected from the group consisting of hydrogen, —O-alkyl groups, hydroxy groups, nitro groups, amino groups, cyano groups, trifluoromethyl groups, and alkyl groups, and M is selected from the group consisting of $Ni^{+2}$ and $Cu^{+2}$.

5. A composition of matter as set forth in claim 4 wherein said alkyl groups include no more than about twenty carbon atoms.

6. A composition of matter as set forth in claim 4 wherein $R_2$ and $R_3$ are selected from the group consisting of nitro groups, amino groups, trifluoromethyl groups, and cyano groups.

7. A composition of matter as set forth in claim 1 wherein said ultraviolet light inhibitor is present in an amount between about 1.0% and about 5.0%.

8. A composition of matter as set forth in claim 1 including an antioxidant for said polymer.

9. A composition of matter as set forth in claim 8 wherein said antioxidant is a phenolic antioxidant.

References Cited

UNITED STATES PATENTS

| | | | |
|---|---|---|---|
| 3,004,896 | 10/1961 | Heller | 260—45.95 |
| 3,074,909 | 1/1963 | Matlack | 260—45.75 |
| 3,300,417 | 1/1967 | McElroy | 260—2.3 |
| 3,355,422 | 11/1967 | Brindell | 260—45.85 |
| 3,357,954 | 12/1967 | Kirkaldy | 260—75 |
| 3,368,997 | 2/1968 | Gordon | 260—45.8 |
| 3,377,308 | 4/1968 | Oertel | 260—32.6 |
| 3,377,322 | 4/1968 | Witsiepe | 260—77.5 |

DONALD E. CZAJA, Primary Examiner

V. R. HOKE, Assistant Examiner

U.S. Cl. X.R.

260—45.95

PO-1050
(5/69)

UNITED STATES PATENT OFFICE
CERTIFICATE OF CORRECTION

Patent No. 3,499,869      Dated March 10, 1970

Inventor(s) Gerald R. Lappin and Gordon C. Newland

It is certified that error appears in the above-identified patent and that said Letters Patent are hereby corrected as shown below:

Column 4, lines 72-75, Formula III should read:

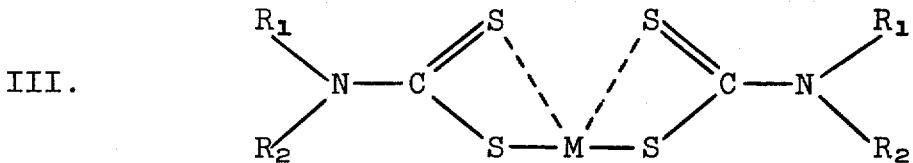

Column 6, line 23, the word "ultravolet" should be ---ultraviolet---; Column 6, line 64, the word "etxender" should be ---extender---; Column 8, line 48 should read ---group consisting of I. metal chelates of 1,3-diketone enols---; Column 8, line 61 should read ---group consisting of $Ni^{+2}$ and $Cu^{+2}$, and II. metal chelates---.

SIGNED AND
SEALED
OCT 8 - 1970

(SEAL)
Attest:

Edward M. Fletcher, Jr.
Attesting Officer

WILLIAM E. SCHUYLER, JR.
Commissioner of Patents